United States Patent
Buck et al.

[11] Patent Number: 6,093,130
[45] Date of Patent: Jul. 25, 2000

[54] MULTI-SPEED TRANSMISSION FOR ELECTRICAL POWER TOOLS

[75] Inventors: Manfred Buck, Nuertingen; Siegfried Fehrle, Leinfelden-Echterdingen; Juergen Schmidt, Rottenburg a. N., all of Germany

[73] Assignee: Robert Bosch GmbH, Stuttgart, Germany

[21] Appl. No.: 09/063,507

[22] Filed: Apr. 21, 1998

[30] Foreign Application Priority Data

Apr. 25, 1997 [DE] Germany .......................... 197 17 466

[51] Int. Cl.[7] .......................................................... F16H 3/56
[52] U.S. Cl. ............................ 475/298; 475/339; 475/311; 408/124; 173/216; 464/36
[58] Field of Search .................................. 475/149, 153, 475/339, 296, 298, 311, 314, 300; 408/124; 173/216, 217; 81/57.11; 464/36

[56] References Cited

U.S. PATENT DOCUMENTS

| | | | |
|---|---|---|---|
| 3,774,476 | 11/1973 | Sohnlein et al. | 475/299 |
| 3,872,742 | 3/1975 | States | 475/299 |
| 4,448,098 | 5/1984 | Totsu | 81/57.11 X |
| 4,489,626 | 12/1984 | Lemon | 475/314 X |
| 4,729,260 | 3/1988 | Dudden | 81/57.11 X |
| 4,898,249 | 2/1990 | Ohmori | 475/263 X |
| 5,011,341 | 4/1991 | DeGroff | 475/337 X |
| 5,339,908 | 8/1994 | Yokota et al. | 475/298 X |
| 5,376,057 | 12/1994 | Cooper et al. | 475/339 X |
| 5,782,593 | 7/1998 | Klement | 475/331 X |

FOREIGN PATENT DOCUMENTS 0 566 926 A1  10/1993  European Pat. Off. .

*Primary Examiner*—Charles A Marmor
*Assistant Examiner*—Ankur Parekh
*Attorney, Agent, or Firm*—Michael J. Striker

[57] ABSTRACT

A multi-speed transmission for electrical power tools with a rotatable tool has a machine housing, a working spindle supported in the housing for rotating the tool, an electric motor, a gear reducer shaft which is driven by the electric motor, a planetary transmission arranged between the working spindle and the gear reducer shaft, the planetary transmission including a sun gear, planetary gears and a planetary gear carrier, the planetary gear carrier being coupled with the gear reducer shaft, the sun gear being formed switchably so that it is coupled for joint rotation with the machine housing for a slower speed and with the working spindle for a faster speed.

17 Claims, 1 Drawing Sheet

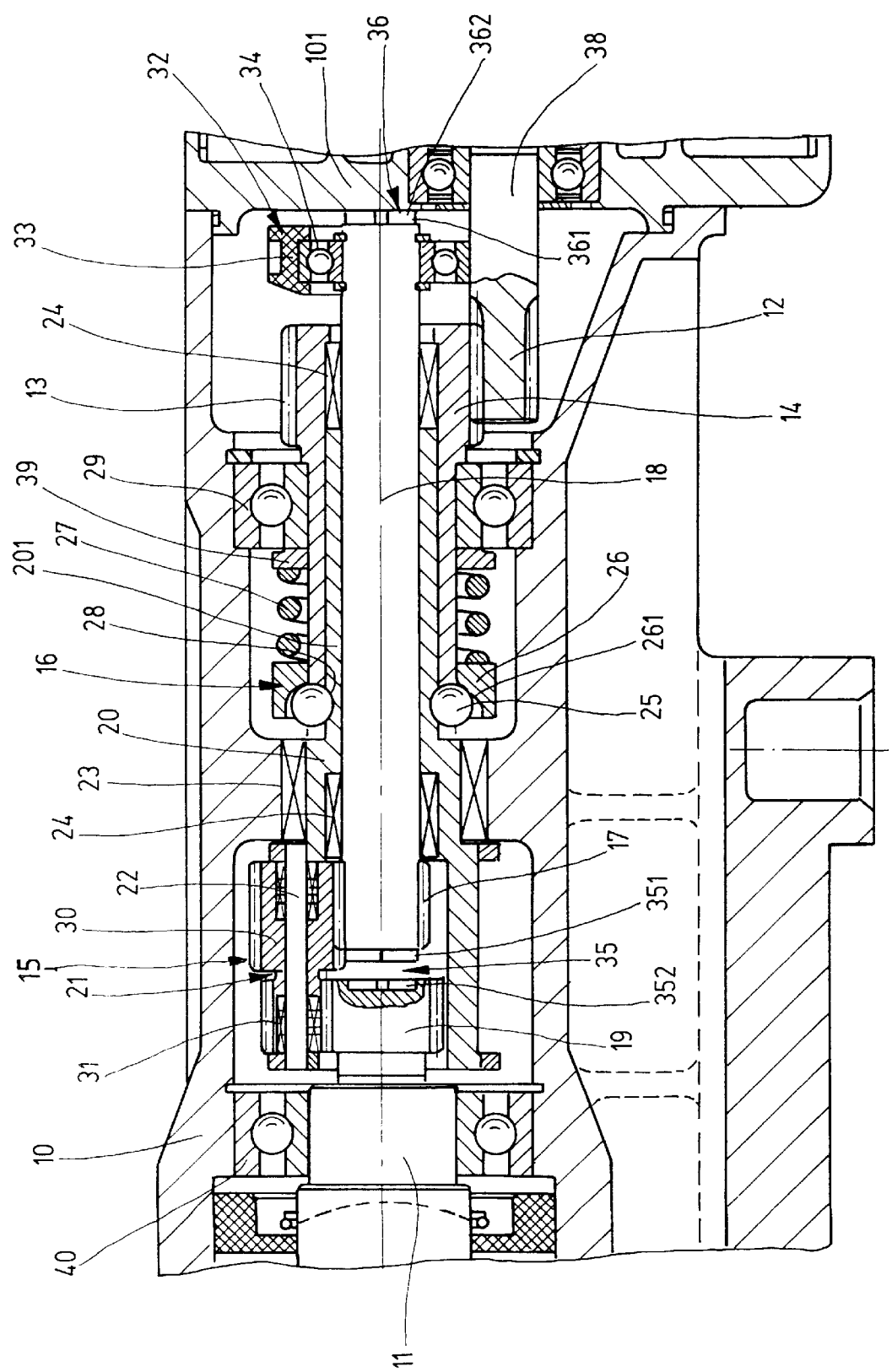

MULTI-SPEED TRANSMISSION FOR ELECTRICAL POWER TOOLS

BACKGROUND OF THE INVENTION

The present invention relates to a multi-speed transmission for electrical power tools with a rotatable tool, in particular power drills.

A known multi-speed transmission of this type is disclosed for example in the patent document EP 0 566 926 A1. It is formed as a planetary transmission switchable in two speeds. For this purpose its sun gear is mounted on the gear reducer shaft, and the planetary gear carrier supported through a needle bearing on the gear reducer shaft carries an outer toothing which is in constant engagement with a toothed rim which drives the tooth spindle. An arresting toothing is formed on the hollow gear of the planetary transmission provided with inner teeth. The arresting toothing is associated with an arresting piece mounted on the housing, and a peripheral groove is provided for a speed switching slider. Additionally, the planetary carrier is associated with a gear having an outer toothing and connected with the planetary gear carrier through segments guided between the planetary gears. The outer toothing of the gear is formed so that the inner toothing of the hollow gear is insertable into it. In the first speed, the hollow gear is displaced so that it is fixed by an arresting toothing on the arresting piece. The sun gear connected with the gear reducer shaft is thereby driven through the planetary gears of the planetary gear carrier with a transmission ratio of 1:3.4 in rotation. Through the toothed rim which engages with the outer toothing of the planetary gear carrier, the tooth spindle is thereby driven with a low rotary speed of 700 revolutions per minute. In the second speed, the hollow gear is displaced in its central position, in which it additionally engages in the outer toothing of the gear, so that it is blocked on the planetary gear carrier. The planetary gear carrier is thereby non rotatably connected directly with the sun gear, and the gear rim of the tool spindle is driven with a transmission ratio of 1:1 with a rotary speed of 2250 revolutions per minute.

SUMMARY OF THE INVENTION

Accordingly, it is an object of present invention to provide a multi-speed transmission which is a further improvement of the existing transmissions.

In keeping with these objects and with others which will become apparent hereinafter, one feature of present invention resides, briefly stated, in a multi-speed transmission for electrical power tools with rotatable tool, in which the planetary gear carrier is coupled with the gear reducer shaft, and the sun gear is formed switchable so that on the one hand it is non rotatably coupled with the machine housing for a slower speed and on the other hand, it is non rotatably coupled with the working spindle for a faster speed.

When the multi-speed transmission is designed in accordance with the present invention, it has the advantage that because of the switchable sun gear in a structurally very simple manner, a two-speed transmission is formed which makes possible a switching of the speeds during the full rotary speed.

The transmission is manufactured in a cost-favorable manner, since on the planet carrier only a few complicated parts are provided with a small number which contributes to a desired low weight of the transmission. The transmission can be pre-mounted so that the mounting time of the electric power tool is substantially reduced.

In accordance with a preferable embodiment of the invention, the planetary transmission has a second sun gear coupled with the working spindle and having a gear axis coinciding with the first sun gear. It also has a gear diameter which deviates from the first sun gear. Each two planetary gears which engage with corresponding first and second sun gears have planetary gear diameters deviating from one another and are connected with one another fixedly to form a planetary gear pair which is freely rotatably supported on an axle fixed on the planetary gear carrier. With this structural embodiment, a compact structure of the planetary transmission is provided, which because of the absence of the hollow gear can be maintained with a relatively small diameter. By corresponding design of the toothed rim on the sun and planetary gears, a transmission ratio of 1:2 is possible.

In accordance with a further advantageous embodiment of the invention, there are three planetary gear pairs which are freely rotatably supported on axles which are fixed on the planetary gear carrier and offset relative to one another by 120°. With this construction, the force flux in the planetary transmission is distributed over three planetary gears and thereby an increased service life of the transmission is obtained.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a longitudinal section of a two-speed transmission for an electrical diamond core power drill.

DESCRIPTION OF PREFERRED EMBODIMENTS

A two-speed transmission shown in a longitudinal section in FIG. 1 is provided for a power drill, here a diamond core power drill, as a specific example for a general electrical power tool. The power drill has a housing 10. A working spindle 11 for rotating a not shown tool by means of a ball bearing, here a ball bearing 40 is rotatably supported in the housing. The working spindle 11 is driven by a not shown electric motor. Its driven shaft 38 engages through a drive pinion 12 with a toothed rim 13 of a gear reducer shaft formed here as a drive sleeve 14. The drive sleeve 14 is rotatably supported in the housing 10 through a ball bearing 29 and transmits its rotary movement by a planetary transmission 15 to the working spindle 11. An overloading coupling 16 is arranged between the drive sleeve 14 and the planetary transmission 15.

The planetary transmission 15 has a first sun gear 17 which is formed of one piece with the end of a switching shaft 18, and a second sun gear 19 which is fixedly connected with the working spindle 11. A planetary gear carrier 20 and three planetary gear pairs 21 which are offset from one another by a peripheral angle of 120° and arranged freely rotatably on three axles 22 which are fixed on the planetary gear carrier 20. The planetary gear carrier 20 extends with the hollow shaft 201 into the drive sleeve 14, partially engage the switching shaft 18 and is rotatably supported on the housing 10 through a sliding bearing 23.

The switching shaft 18 is pulled through the drive sleeve 14 and the planetary gear carrier 20 is supported by two sliding bearings 24 on the one hand in the drive sleeve 14 and on the other hand with the planetary gear carrier 20, rotatably and with a limited axial displaceability.

The overloading coupling 16 acts between the drive sleeve 14 and the hollow shaft 201 of the planetary gear carrier 20. It is composed of three drive balls 25 which are inserted in corresponding openings in the drive sleeve 14, and a coupling ring 26 which is pressed by a coupling spring 27 with a conical surface 261 against the drive balls 25. The coupling spring 27 is supported through a supporting disk 39 on the inner ring of the ball bearing 29 which sits on the drive sleeve 14. The three drive balls 25 engage in the corresponding depressions 28 which are formed at the hollow shaft 201 at the planetary gear carrier 20, and thereby transmit the rotary movement of the drive sleeve 14 to the planetary gear carrier 20. Both sun gears 17, 19 are oriented colinearly with their axes and have different diameters. The three planetary pairs 21 are composed each of a planetary gear 30 which engages with the first sun gear 17, and a planetary gear 31 which engages with the second sun gear 19 and has a smaller diameter. In correspondence with their diameters, the planetary gears 30 have a greater number of teeth and the planetary gear 31 has a smaller number of teeth. The both planetary gears 30, 31 are connected with one piece with one another, and form a fixed structural unit which is identified as a planetary gear pair 21.

The displacement of the switching shaft 18 is performed by a speed selection device 32 which has an adjusting member 33 axially displaceable in the housing 10. The adjusting member 33 engages over the outer ring of a bolt bearing 34 or is non rotatably connected with it by a snap connection. The inner ring of the ball bearing 34 sits in turn non rotatably on the switching shaft 18. The rotary uncoupling of the adjusting member 33 from the switching shaft 18 is ensured by a ball bearing 34. As not shown in the drawings, a speed selection lever engages with the adjusting member 33 for a manual actuation of the switching shaft 18 from its position shown in the drawings by a predetermined magnitude to the left and again back.

On each end of the switching shaft 18 is provided by a part 351 or 361 of a claw coupling 35 and 36. The second coupling part 352 of the claw coupling 35 is formed in the end surface of the second sun gear 19 which faces a first sun gear 17. The second coupling part 362 of the claw coupling 36 is formed on a housing wall 101 of the machine housing 10 oriented toward the machine housing axis. Depending on the position of the speed selection switch of the speed selection device 32, one of the ball claw couplings 35, 36 is released and the other of the ball claw coupling 36, 35 is engaged, whereby two switching positions of the multi-speed transmission are provided.

In the drawings, the speed selection device 32 has such a position, in which the first or the slower speed of the two speed transmission is activated. The claw coupling 36 is engaged and the claw coupling 35 is released. Thereby the sun gear 17 is fixed by the switching shaft 18 on the housing 10 and stands still. The force flux is transmitted from the drive pinion 12 to the drive sleeve 14 and through the overloading coupling 16 to the planetary gear carrier 20. The planetary gear pair 21 engages on the one hand in the immovable first sun gear 17 and on the other hand, in the second sun gear 19 and drives the latter. Due to the rotating sun gear 19, the working spindle 11, which is fixedly connected with it, is rotated. With the corresponding selection of the number of teeth of the planetary gears 30 and the planetary gear 31 of the planetary gear pair 21 a transmission ratio of 1:2 is possible.

For switching over to the second or faster speed, the speed selection switch of the speed selection device 32 is actuated so that the adjusting member 33 is displaced to the left in the drawing. Through the adjusting member 33 the switching shaft 18 is also displaced to the left, whereby the claw coupling 36 is released and the claw coupling 35 is engaged. The both sun gears 17, 19 are non rotatably connected with one another. The planetary gear pair 21 with the sun gear 17, 19 remains in engagement, the whole planetary transmission 15 is blocked and the planetary transmission 15 rotates with the input rotary speed which is not converted. The force flux extends from the drive pinion 12 to the drive sleeve 14, from which it is transmitted through the overloading coupling 16 to the sun gear 17 and from there through the claw coupling 35 directly to the sun gear 19 and the working spindle 11.

It will be understood that each of the elements described above, or two or more together, may also find a useful application in other types of constructions differing from the types described above.

While the invention has been illustrated and described as embodied in multi-speed transmission for electrical power tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multi-speed transmission for electrical power tools with a rotatable tool, comprising a machine housing; a working spindle supported in said housing for rotating the tool; a gear reducer shaft adapted to be driven by an electric motor; a planetary transmission arranged between said working spindle and said gear reducer shaft, said planetary transmission including a first sun gear, planetary gears and a planetary gear carrier, said planetary gear carrier being coupled with said gear reducer shaft, said sun gear being formed switchably so that it is coupled for joint rotation with said machine housing for a slower speed and with said working spindle for a faster speed, said planetary transmission having a second sun gear which is coupled with said working spindle and has a gear axis coinciding with said first mentioned sun gear, and said planetary gears including at least two planetary gears which engage with said first and second sun gears, have different diameters and form a planetary gear pair which is rotatably supported on an axle fixed with said planetary gear carrier.

2. A multi-speed transmission as defined in claim 1; and further comprising a drive sleeve which couples said planetary gear carrier with said gear reducer shaft.

3. A multi-speed transmission as defined in claim 1, wherein said planetary gears which form said planetary gear pair are fixedly connected with one another and of one-piece with one another.

4. A multi-speed transmission as defined in claim 1, wherein said planetary transmission has three said planetary gear pairs which are each freely rotatably supported on its own axle and are peripherally offset relative to one another by 120°.

5. A multi-speed transmission as defined in claim 1, wherein said second sun gear is arranged coaxially to said working spindle and fixedly connected with the latter.

6. A multi-speed transmission as defined in claim 5, wherein said second sun gear is of one piece with said working spindle.

7. A multi-speed transmission as defined in claim 1; and further comprising a manually operated speed selection device for switching said sun gear, said speed selection device having a coupling element which is displaceably supported in said machine housing and cooperates with a coupling counter member arranged in said machine housing and in said second sun gear.

8. A multi-speed transmission as defined in claim 7, wherein said coupling element is formed as a switching shaft.

9. A multi-speed transmission as defined in claim 8, wherein said gear reducer shaft is formed as a drive sleeve supported ins aid machine housing, said planetary gear carrier has a hollow shaft which extends into said drive sleeve and is fixedly coupled with the latter, said supporting said first sun gear, said switching shaft passing through said drive sleeve and a hollow shaft of said planetary gear carrier and is rotatably and axially displaceably supported.

10. A multi-speed transmission as defined in claim 9, wherein said switching shaft is formed of one piece with said sun gear.

11. A multi-speed transmission as defined in claim 9, wherein said switching shaft is rotatably and axially displaceably supported in said hollow shaft.

12. A multi-speed transmission as defined in claim 11, wherein said switching shaft is rotatably and axially displaceably supported in said drive sleeve.

13. A multi-speed transmission as defined in claim 9; and further comprising a claw coupling which is alternatingly engageable and disengageable by an axial displacement of said switching shaft.

14. A multi-speed transmission as defined in claim 13, wherein said claw coupling is arranged between one end side of said switching shaft and an end surface of said second sun gear.

15. A multi-speed transmission as defined in claim 13, wherein said claw coupling is arranged between one end side of said switching shaft and a housing wall of said machine housing extending transversely to an axis of said machine housing.

16. A multi-speed transmission as defined in claim 1; and further comprising a speed selection device having an adjusting member which is freely rotatably and axially non-displaceably arranged on a switching shaft, and a speed selection lever which engages said adjusting member for an axial displacement.

17. A multi-speed transmission for electrical power tools with a rotatable tool, comprising a machine housing; a working spindle supported in said housing for rotating the tool; a gear reducer shaft adapted to be driven by an electric motor; a planetary transmission arranged between said working spindle and said gear reducer shaft, said planetary transmission including a first sun gear, planetary gears and a planetary gear carrier, said planetary gear carrier being coupled with said gear reducer shaft, said sun gear being formed switchably so that it is coupled for joint rotation with said machine housing for a slower speed and with said working spindle for a faster speed; a drive sleeve which couples said planetary gear carrier with said gear reducer shaft; and an overloading coupling provided between said drive sleeve and a hollow shaft of said planetary gear carrier.

* * * * *